United States Patent
Okura et al.

[11] Patent Number: 5,917,712
[45] Date of Patent: Jun. 29, 1999

[54] SELF OSCILLATING POWER SUPPLY

[75] Inventors: Hideki Okura, Ichishi-gun; Makoto Ono, Matsusaka; Etsuo Tsujimoto, Tsu; Fumiaki Hashimoto, Matsusaka, all of Japan

[73] Assignee: Matsushita Electric Industrial Co., Ltd., Osaka, Japan

[21] Appl. No.: 08/952,123

[22] PCT Filed: May 9, 1996

[86] PCT No.: PCT/JP96/01233

§ 371 Date: Jan. 26, 1998

§ 102(e) Date: Jan. 26, 1998

[87] PCT Pub. No.: WO96/36102

PCT Pub. Date: Nov. 14, 1996

[30] Foreign Application Priority Data

| May 10, 1995 | [JP] | Japan | 7-111489 |
| Jun. 2, 1995 | [JP] | Japan | 7-136496 |
| Jun. 16, 1995 | [JP] | Japan | 7-149845 |
| Sep. 4, 1995 | [JP] | Japan | 7-226194 |
| Sep. 6, 1995 | [JP] | Japan | 7-228773 |

[51] Int. Cl.⁶ .................................................. H02M 3/335
[52] U.S. Cl. ............................................. 363/19; 363/56
[58] Field of Search .................................. 363/56, 19, 18, 363/97, 131

[56] References Cited

U.S. PATENT DOCUMENTS 4,652,984  3/1987  Van Der Akker et al. ............... 363/18
4,937,727  6/1990  Leonardi ................................. 363/97

FOREIGN PATENT DOCUMENTS

| 48-111827 | 12/1973 | Japan. |
| 52-26447 | 7/1977 | Japan. |
| 56-132177 | 10/1981 | Japan. |
| 58-178422 | 10/1983 | Japan. |
| 61-26302 | 6/1986 | Japan. |
| 7-46841 | 2/1995 | Japan. |

*Primary Examiner*—Shawn Riley
*Attorney, Agent, or Firm*—Ratner & Prestia

[57] ABSTRACT

An inexpensive highly reliable power supply for small-sized electronic devices, in which any high-withstand-voltage diode which has been used conventionally is not used and reverse leak currents are prevented. A series circuit of a primary-side coil (34) of a switching transformer and a switching element (35) is connected between both ends of an input power source (31) and a series circuit composed of a resistor (32) and a capacitor (33) is also connected between both ends of the power source (31). The connecting point between the resistor (32) and capacitor (33) is connected to one end of the control winding (37) of the switching transformer and the other end of the winding (37) of the transformer is connected to the control terminal of the switching element (35). A discharge circuit (40) which is driven by signals from the control winding (37) of the transformer is used as a means for discharging the capacitor (33).

11 Claims, 10 Drawing Sheets

SELF OSCILLATING POWER SUPPLY

This Application is a U.S. National Phase Application of PCT International Application PCT/JP96/01233.

TECHNICAL FIELD

The present invention relates to a power supply device used in various electronic appliances, and more particularly to a power supply device useful as a non-contact power supply device used in small portable appliances, for example, cordless telephone, cellular telephone, PHS, video with camera, and personal computer.

BACKGROUND ART

In a power supply device generally known, an output is obtained at a secondary side by resonating the voltage of a primary side coil of a switching transformer and a capacitor connected at its both ends.

As means for obtaining a stabilized output at the secondary side, a circuit composition for controlling the primary side, or a circuit composition for controlling the secondary side are used, among others.

First, as the means for controlling the primary side, FIG. 15 shows a circuit diagram of a conventional power supply device for controlling and stabilizing the on/off period of switching by installing a control circuit at the primary side, and feeding back the gate signal of the switching element as means for stabilizing and oscillating, to the output of the switching element by an impedance circuit composed of a series circuit of resistance and diode. According to the diagram, an input power source 1 is a DC voltage rectified and smoothed from a commercial power source, and a series circuit of starting circuit composed of a resistance 2 and a capacitor 3 is connected to both ends of the input power source 1, and a series circuit of a primary side coil 4 of switching transformer and switching element 5 is connected, and a capacitor 6 is connected to both ends of the primary side coil 4 of the switching transformer.

Moreover, the junction of the resistance 2 and capacitor 3 is connected to the drain of the switching element 5 through a series circuit of a resistance 7 and diode 8, and is further connected to the gate of the switching element 5 through a control winding 9 of the switching transformer. A capacitor 11 is connected to both ends of a secondary side coil 10 of the switching transformer, and a capacitor 13 is connected through a diode 12, thereby obtaining an output at both ends of the capacitor 13. Incidentally, the load side after the secondary side coil 10 of the switching transformer is separable, and an output can be obtained as required.

The operation of the conventional power supply device is described below. First, when the input power source 1 is applied, a voltage starts to be charged into the capacitor 3 through the resistance 2. The voltage of the capacitor 3 is fed into the gate of the switching element 5 through the control winding 9 of the switching transformer, and when reaching the threshold voltage of the gate, the switching element 5 begins to conduct. As a result, a voltage is induced in the control winding 9 of the switching transformer and the secondary side coil 10 of the switching transformer, and the voltage of the control winding 9 of the switching transformer elevates, and the gate voltage of the switching element 5 is further increased, so that the switching element 5 is completely turned on instantly by the positive feedback action.

Therefore, the current of the primary side coil 4 of the switching transformer, that is, the drain current of the switching element 5 increases linearly, and the energy is accumulated in the primary side coil 4 of the switching transformer. As the switching element 5 is completely turned on, an impedance circuit 14 of resistance 7 and diode 8 (or, an impedance circuit 15 shown in FIG. 15, instead of this impedance circuit 14) begins to discharge the voltage of the capacitor 3, that is, the gate voltage of the switching element 5. By such feedback action, when the gate voltage of the switching element 5 becomes lower than the threshold voltage, the switching element 5 is suddenly turned off.

As the switching element 5 is turned off, the voltage induced in the primary side coil 4 of the switching transformer is inverted, and resonance with the capacitor 6 occurs at the same time. When this resonance voltage is inverted again, it is driven to turn on the switching element 5 again through the control winding 9 of the switching transformer. At the same time, at the secondary side, too, resonance of the secondary side coil 10 of the switching transformer and the capacitor 11 occurs, and a DC output is supplied into the secondary side load 16 by a rectifying and smoothing circuit of diode 12 and capacitor 13.

Next, a prior art of controlling the secondary side output is described in a circuit diagram in FIG. 16. According to the diagram, reference numeral 20 denotes a primary side power supply unit, being composed of a DC input power source 21, a high frequency current generating circuit 22 connected thereto, a primary side resonance capacitor 23, and a primary side coil 24, and reference numeral 25 is a secondary side power source, which is provided in a separate housing from the primary side power supply unit 20, being composed of a secondary side coil 26, a secondary side resonance capacitor 27 connected to both ends of the secondary side coil 26, a secondary side rectifier 28, and an output capacitor 29 having one end connected to the secondary side rectifier 28, and other end connected to the secondary side coil 26, and moreover an output stabilizing circuit 30 and output capacitor 29 are connected, and a secondary side load (not shown) is connected to this output stabilizing circuit.

As described herein, since the prior art is intended to control either the primary side or the secondary side, it is used not only as a power supply device of a general electronic appliance, but also as a non-contact type power supply device having the primary side and secondary side provided in different housings.

However, in the circuit composition in FIG. 15, among the above conventional constitutions, the diode 8 used for feedback is required to have a high withstand voltage because a voltage in reverse direction is applied due to resonance of the primary side coil 4 of the switching transformer when the switching element 5 is turned off. Moreover, since the impedance of the control circuit is very high, a significant effect may be applied to the switching action of turn-on and turn-off of the switching element 5 due to reverse leak current of the diode 8, and the diode 8 is required to have a very small reverse leak current. Yet, for operation at high frequency of several hundreds of kHz, high frequency switching is required at the same time. The diode satisfying such characteristic is very hard to manufacture and very high in cost.

In the circuit composition in FIG. 16, incidentally, in order to obtain an output of high precision, a larger power loss occurs in the output stabilizing circuit 30.

It is hence an object of the invention to solve such problems and present a power supply device capable of obtaining a stable secondary output efficiently.

DISCLOSURE OF THE INVENTION

To solve the problems, according to the power supply device of the invention, for controlling the primary side, a series circuit of a primary side coil of a switching transformer and a switching element is connected to both ends of an input power source, a series circuit of a resistance and a capacitor is connected in the input power source, the junction of the resistance and the capacitor is connected to one end of the control winding of the switching transformer, other end of the control winding of the switching transformer is connected to a control terminal of the switching element, and means for discharging the capacitor is composed of a discharge circuit driven by the signal of the control winding of the switching transformer, and in this constitution, without using the diode of high withstand voltage, a power supply device operating stably without effect of reverse leak current is realized.

For controlling the secondary side, meanwhile, a series circuit of a capacitor and an impedance variable circuit is connected to both ends of the secondary side coil, an output detection circuit for detecting the output of the secondary side coil is provided, and the impedance variable circuit is controlled by the output of the secondary side coil, and therefore this constitution realizes a power supply device capable of maintaining the secondary side output very stably against fluctuations of input voltage or output state.

BEST MODE FOR CARRYING OUT THE INVENTION

Embodiment 1

Figure 1:
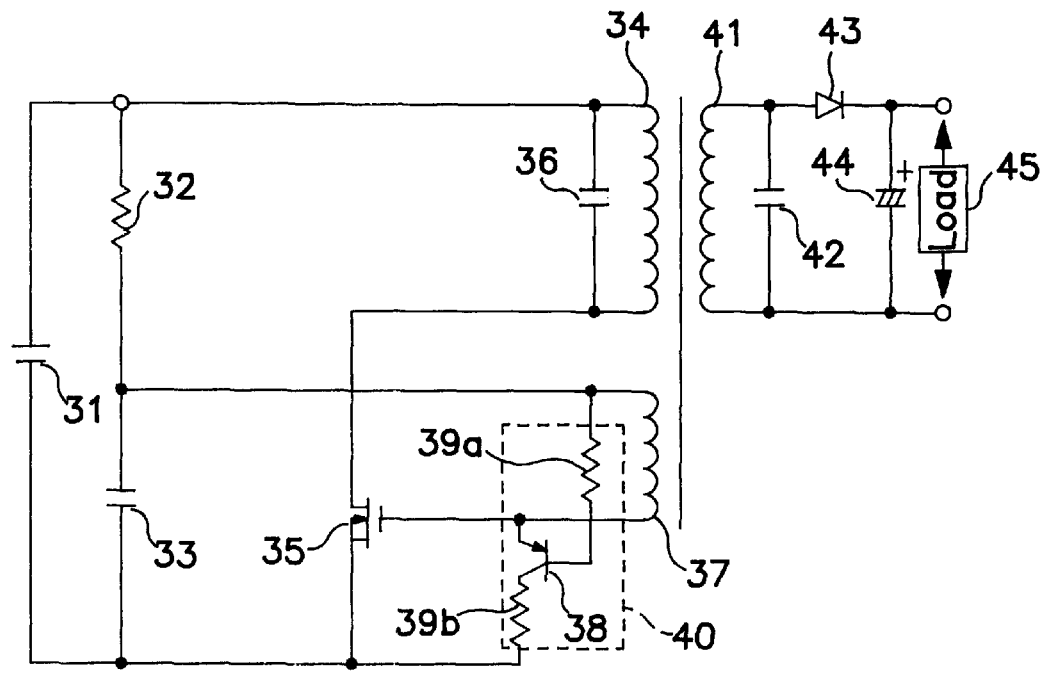
FIG. 1 is a circuit block diagram of an embodiment of a power supply device of the invention.

An embodiment of a power supply device of the invention is described below while referring to FIG. 1.

In the diagram, a control circuit is provided at the primary side, and according to the diagram, an input power source 31 is a DC voltage rectified and smoothed from a commercial power source, a series circuit of a resistance 32 and a capacitor 33 is connected at both ends of this input power source 31, and a series circuit of primary side coil 34 of switching transformer and switching element 35 is connected, and a capacitor 36 is connected at both ends of the primary side coil 34 of the switching transformer.

The junction of the resistance 32 and capacitor 33 is connected to one end of a control winding 37 of the switching transformer, and other end is connected to the gate of the switching element 35. A discharge circuit 40 composed of a control transistor 38 and resistances 39a, 39b is driven by a signal of the control winding 37 of the switching transformer, thereby discharging the electric charge of the capacitor 33. A capacitor 42 is connected to both ends of a secondary side coil 41 of the switching transformer, and a capacitor 44 is connected through a diode 43, so that an output is obtained at both ends of the capacitor 44. The load side after the secondary side coil 41 of the switching transformer is separable, so that an output may be obtained as required.

The operation is described below. When the input power source 31 is applied, a voltage begins to be charged into the capacitor 33 through the resistance 32. The voltage of the capacitor 33 is fed into the gate of the switching element 35 through the control winding 37 of the switching transformer, and when this voltage reaches the threshold voltage of the gate, the switching element 35 begins to conduct. As a result, a voltage is induced in the control winding 37 of the switching transformer and the secondary side coil 41 of the switching transformer, and by voltage elevation of the control winding 37 of the switching transformer, the gate voltage of the switching element 35 is further increased, and the switching element 35 is instantly turned on completely by the positive feedback action.

Accordingly, the current of the primary side coil 34 of the switching transformer, that is, the drain current of the switching element 35 increases linearly, and energy is accumulated in the primary side coil 34 of the switching transformer. At this time, when the voltage of the control winding 37 of the switching transformer reaches the threshold voltage of the control transistor 38, the control transistor 38 is turned on instantly, and the capacitor 33 begins to be discharged through the resistance 39b. By such feedback action, when the gate voltage of the switching element 35 becomes lower than the threshold voltage, the switching element 35 is suddenly turned off (in the embodiment, since a field effect transistor (FET) is used in the switching element 35, the threshold voltage is the gate cut-off voltage, and when transistor is used as this switching element, the base voltage of the transistor is the threshold voltage).

Figure 15:
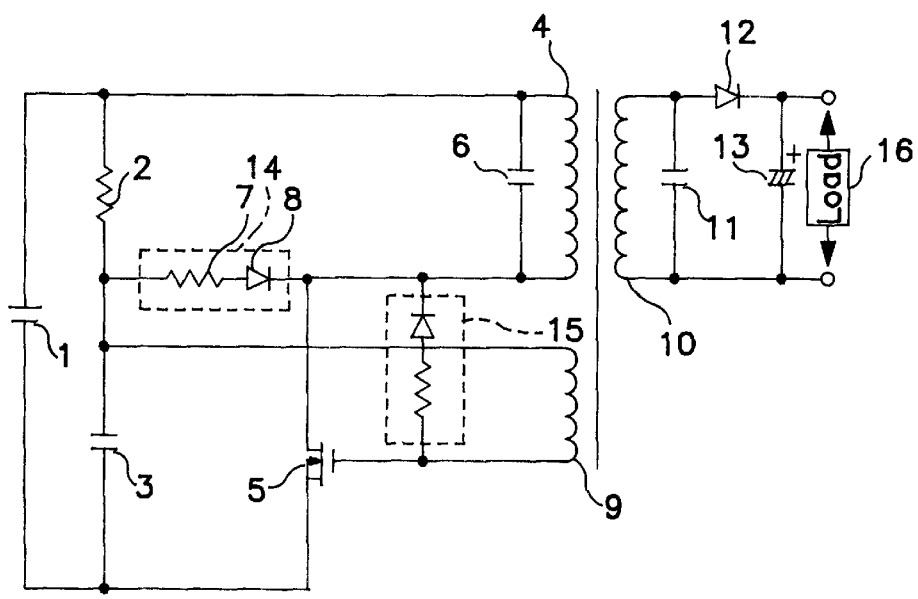
FIG. 15 is a circuit block diagram of a conventional power supply device.

When the switching element 35 is turned off, the voltage induced in the primary side coil 34 of the switching transformer is inverted, and at the same time, resonance with the capacitor 36 occurs. When this resonance voltage is inverted again, the switching element 35 is driven to be turned on again through the control winding 37 of the switching transformer. Same as in the prior art in FIG. 15, at the secondary side, too, resonance of the secondary side coil 41 of switching transformer and capacitor 42 occurs, and a DC output is supplied into a load 45 through a rectifying and smoothing circuit of diode 43 and capacitor 42.

Embodiment 2

Figure 2:
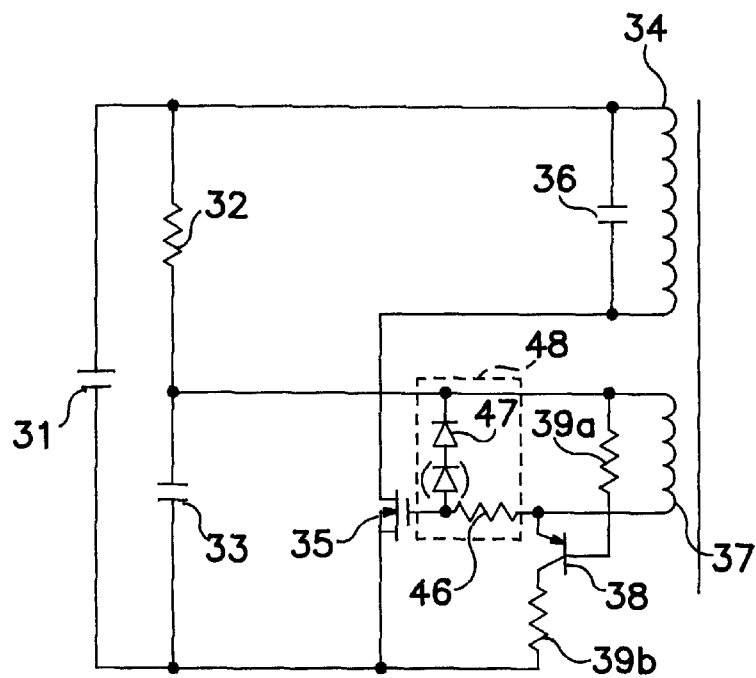
FIG. 2 is a circuit block diagram of a second embodiment.

FIG. 2 is a circuit block diagram of other embodiment, and what differs from the embodiment in FIG. 1 is that a clamp circuit 48 composed of a resistance 46 and a diode 47 is added. Unnecessary spike voltage occurring in the control winding 37 of the switching transformer is applied to the gate of the switching element 35, and adverse effects may be caused on the turn-on and turn-off action of switching. Hence, the voltage applied to the gate is clamped by the clamp circuit 48 by forward voltage drop (VF) of the diode 47, thereby removing the unnecessary spike voltage.

Herein, the element used in the clamp circuit 48 for correcting the temperature changes of the threshold value of the gate voltage of the switching element 35 may be either one diode or plural diodes, or a zener diode or a circuit combining them.

In the foregoing embodiments, the output is determined by the on/off period of the switching action. As mentioned above, the ON period is the time from the switching element 35 being turned on until the voltage of the capacitor 33 is discharged through the resistance 39b to be lower than the threshold voltage of the switching element 35. The OFF period is the time from the switching element 35 being turned off until the voltage of the capacitor 33 is charged from the input power source 31 through the resistance 32 to reach the threshold voltage of the switching element 35. Therefore, it is known that the output is determined by the charge and discharge time of the capacitor 33. It is hence possible to set at an arbitrary output by using a variable resistor in the resistance 32 for charging and discharging the capacitor 33, or the resistance 39b.

Thus, according to the embodiments, one end of the control winding of the switching transformer is connected to the junction of the series circuit of the resistance and capacitor connected to the input power source, the other end of the control winding is connected to the control terminal of the switching element, and a discharge circuit for driving by the signal of the control winding of the switching transformer is connected to one end of the control winding, and therefore, when composing the oscillation circuit and control circuit at the primary side, diode of high withstand voltage is not necessary, and there is no effect of reverse leak current, and the operation is stable, so that an almost ideal switching action is effected, and a highly reliable power supply device can be realized by using inexpensive parts.

Embodiment 3

Figure 3:
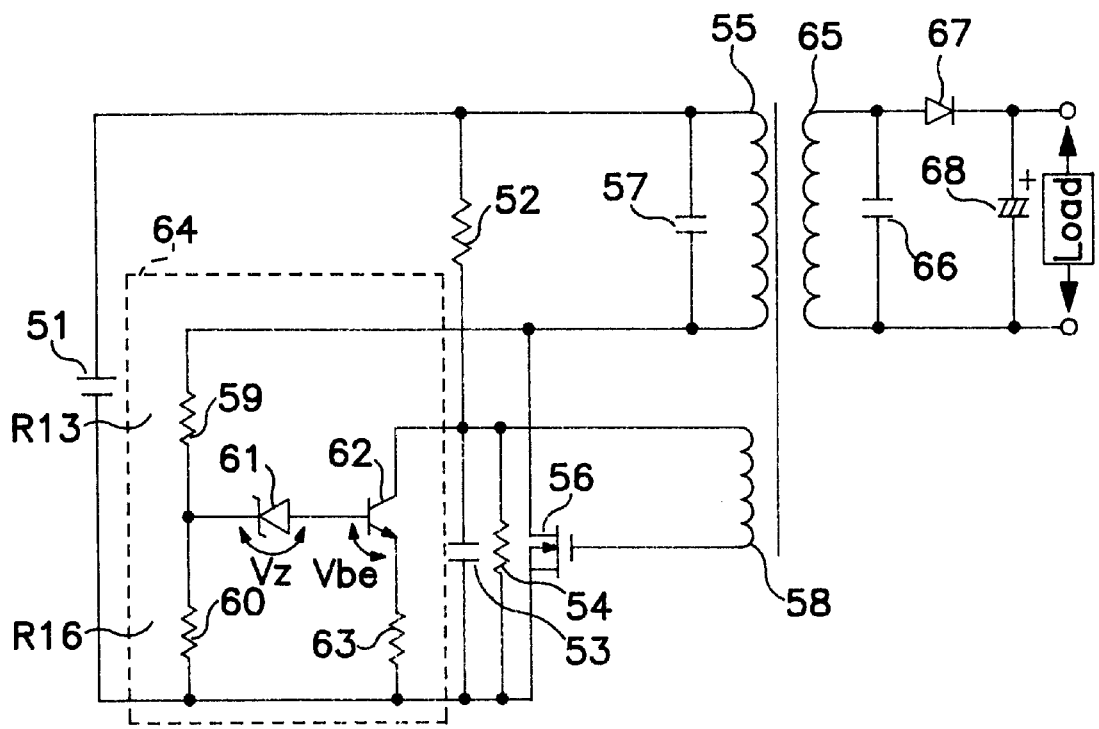
FIG. 3 is a circuit block diagram of a third embodiment.

FIG. 3 is a circuit block diagram of a different embodiment, in which an input power source 51 is a DC voltage rectified and smoothed from commercial power source, or a DC power source such as car battery, and at both ends of the input power source 51, a resistance 52 and a capacitor 53 are connected in series, and a resistance 54 is connected parallel to the capacitor 53. Moreover, at both ends of the input power source, a series circuit of a primary side coil 55 of switching transformer and a switching element 56 is connected, and a capacitor 57 is connected at both ends of the primary side coil 55 of the switching transformer.

The junction of the resistance 52 and capacitor 53 is connected to one end of the control winding 58 of the switching transformer, and the other end of the control winding 58 is connected to the gate of the switching element 56.

A series circuit of resistance 59 and resistance 60 is connected between the drain and source of the switching element 56, a peak voltage control circuit 64 is composed by connecting a transistor 62 and a resistance 63 from the junction of the resistance 59 and resistance 60 through a constant voltage diode 61, and the collector of the transistor 62 is connected to the junction of the resistance 52 and capacitor 53. At both ends of the secondary side coil 65 of the switching transformer, a capacitor 66 is connected, and a capacitor 68 is connected through a diode 67, and an output is obtained at both ends of the capacitor 68. Incidentally, the load after the secondary side coil 65 of the switching transformer is separable, and an output may be obtained as required.

Describing the operation, first, when the input power source 51 is applied, a voltage begins to be charged in the capacitor 53 through the resistance 52. The voltage of the capacitor 53 is fed into the gate of the switching element 56 through the control winding 58 of the switching transformer, and when this voltage reaches the threshold voltage of the gate, the switching element 56 begins to conduct. As a result, a voltage is induced in the control winding 58 of the switching transformer and the secondary side coil 65 of the switching transformer, and by voltage elevation of the control winding 58 of the switching transformer, the gate voltage of the switching element 56 is further increased, and the switching element 56 is instantly turned on completely by the positive feedback action.

Accordingly, the current of the primary side coil 55 of the switching transformer, that is, the drain current of the switching element 56 increases linearly, and energy is accumulated in the primary side coil 55 of the switching transformer. At this time, when the voltage of the capacitor 53 is fixed at a certain voltage by voltage dividing by the resistance 52 and resistance 54, and the gate voltage of the switching element 56 is also limited at this voltage. Therefore, due to the characteristic of FET, by the limitation of the gate voltage, the drain current is also limited, and, as a result, the voltage between the drain and source is raised. Hence, the voltage of the primary side coil 55 of the switching transformer is decreased, and at the same time the voltage of the control winding 58 of the switching transformer is decreased, and thereby the gate voltage of the switching element 56 decreases until becoming lower than the threshold voltage, so that the switching element 56 is suddenly turned off. In this embodiment, meanwhile, since the field effect transistor (FET) is used in the switching element 56, the threshold voltage is a gate cut-off voltage, but when a bipolar transistor is used as the switching element, the base voltage becomes the threshold voltage.

When the switching element 56 is turned off, the voltage induced in the primary side coil 55 of the switching transformer is inverted, and resonance is induced with the capacitor 57 at the same time. At this time, the drain-source voltage of the switching element 56 is elevated in a sinusoidal form by the resonance phenomenon. Supposing the peak value of the drain-source voltage of the switching element 56 to be Vp, when becoming $$Vp > [Vz + Vbe] * \frac{R13 + R16}{R16}$$

where R13 is the resistance value of the resistance 59, and R16 is the resistance value of the resistance 60, a peak voltage control circuit 64 is put in action to effect negative feedback control to lower the voltage of the capacitor 53, thereby controlling so that Vp may be constant in every pulse of switching. Soon this resonance voltage is inverted again, and the switching element 56 is controlled to be turned on again through the control winding 58 of the switching transformer. At this time, at the secondary side, too, resonance of the secondary coil 65 of the switching transformer and capacitor 66 occurs, and a DC output is supplied to the secondary side load from the rectifying and smoothing circuit of the diode 67 and capacitor 66.

Figure 4:
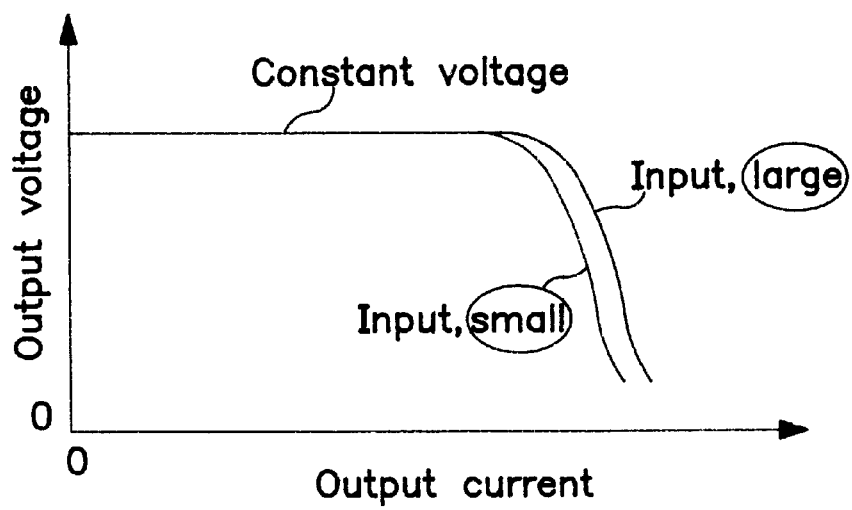
FIG. 4 is an output characteristic diagram of the power supply device of the invention.

Hence, the peak value Vp of the resonance voltage is controlled to be always constant in every pulse of switching in spite of fluctuations of the input power source 51. Accordingly, the output voltage generated in the secondary side coil 65 of the switching transformer is always constant as shown in FIG. 4, and an extremely stable voltage may be supplied to the secondary side output.

Figure 5:
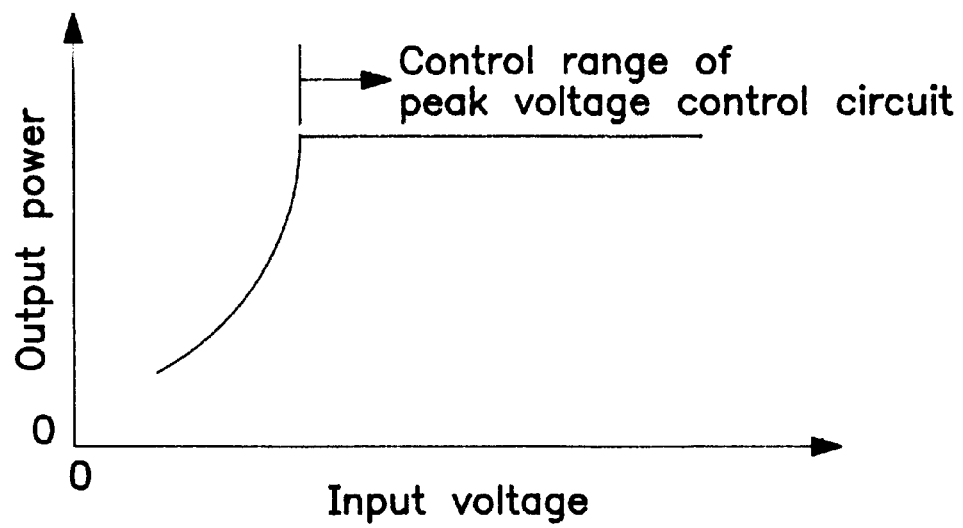
FIG. 5 is an input voltage-output power characteristic diagram of the power supply device of the invention.

FIG. 5 is a characteristic diagram showing the relation between the input voltage and output voltage, which shows that the output power is always kept constant as being controlled by the peak voltage control circuit 64.

Embodiment 4

Figure 6:
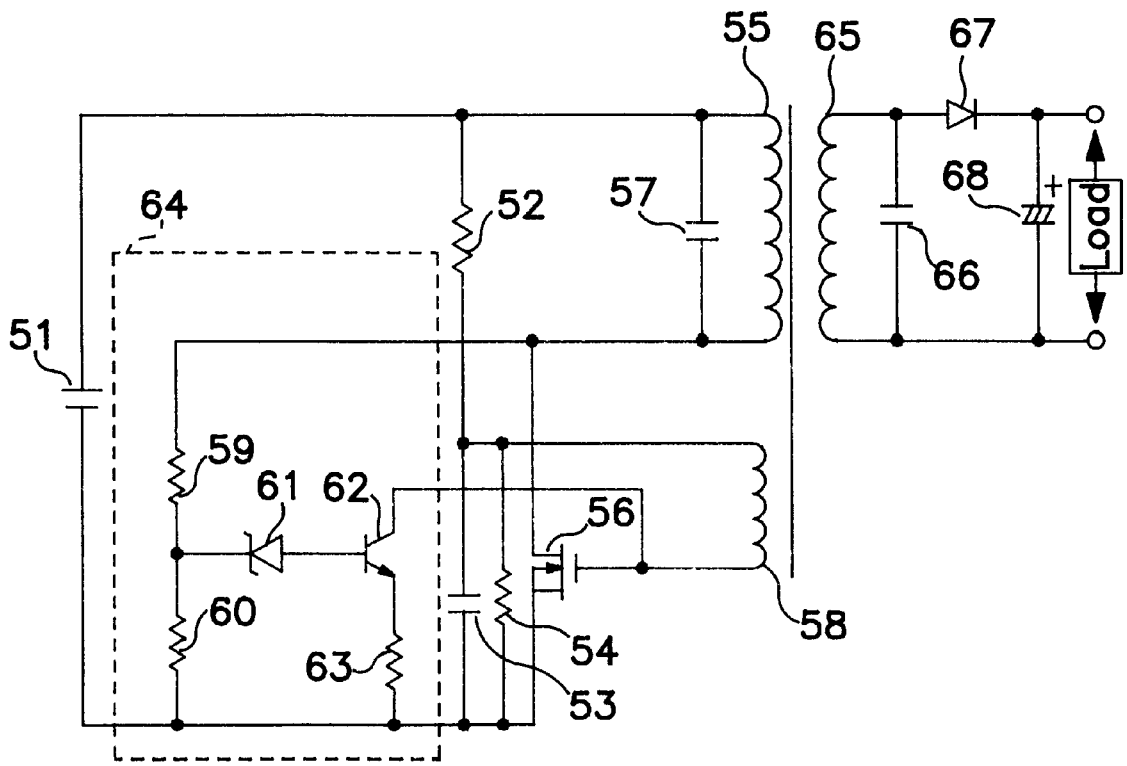
FIG. 6 is a circuit block diagram of a fourth embodiment.

FIG. 6 is a circuit block diagram of an embodiment of the invention, being a developed example of the embodiment in FIG. 3, and explaining only the difference from the embodiment in FIG. 3, in constitution, the output of the peak voltage control circuit 64, that is, the collector of the transistor 62 is directly connected to the gate of the switching element 56, and the same effects as in the embodiment in FIG. 3 are obtained.

Embodiment 5

Figure 7:
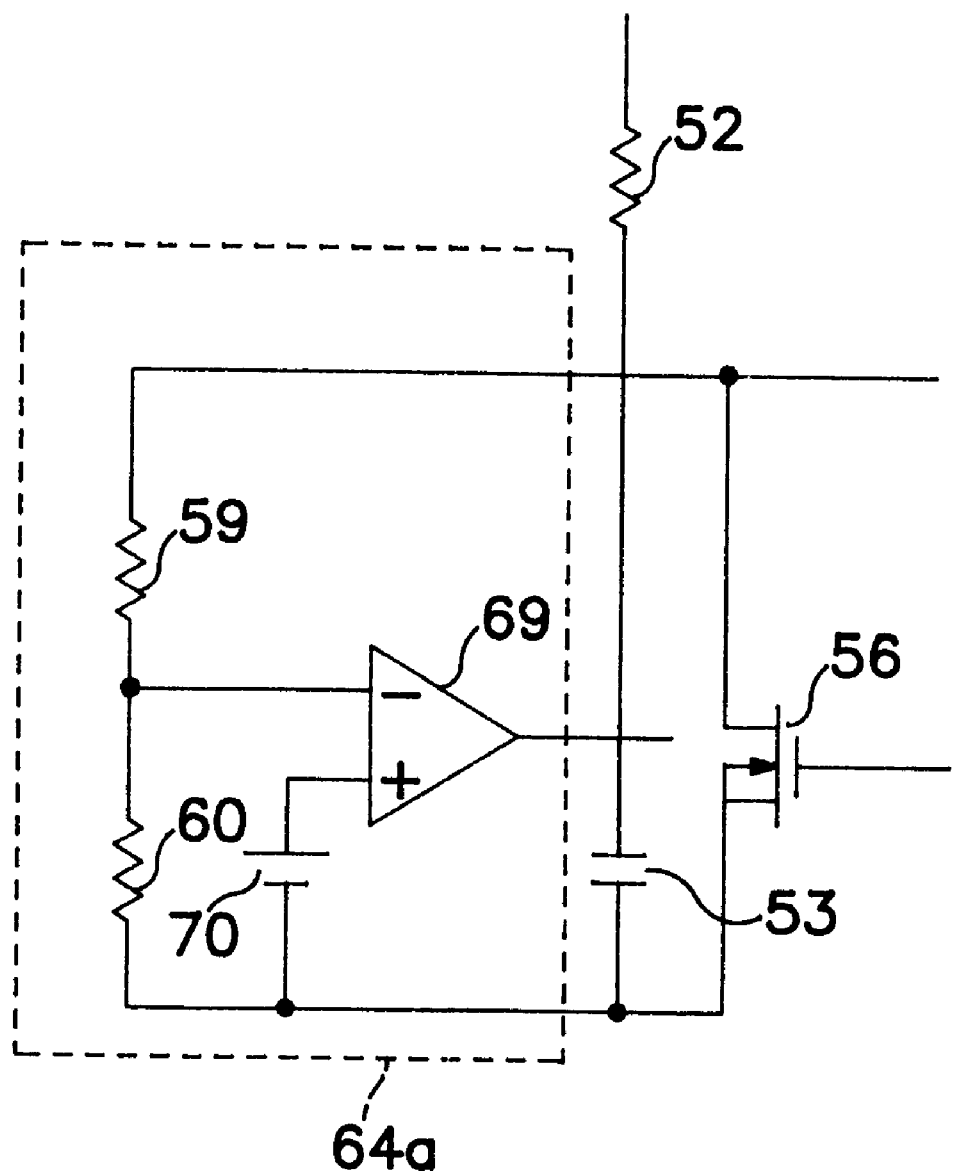
FIG. 7 is a circuit block diagram of essential parts of a fifth embodiment.

FIG. 7 is a circuit block diagram of a peak voltage control circuit which is an essential component in an embodiment of the invention, and other circuit parts are same as in the circuit composition in FIG. 3.

Instead of the transistor 62 and constant voltage diode 61 in FIG. 3, a comparator (or operational amplifier) 69 and a reference voltage 70 are used to compose a peak voltage control circuit 64a, and the same effects as in the embodiment in FIG. 3 are obtained. In the foregoing embodiments, the control circuit is provided at the primary side, and an embodiment of installing the control circuit at the secondary side is described below.

Embodiment 7

Figure 8A:
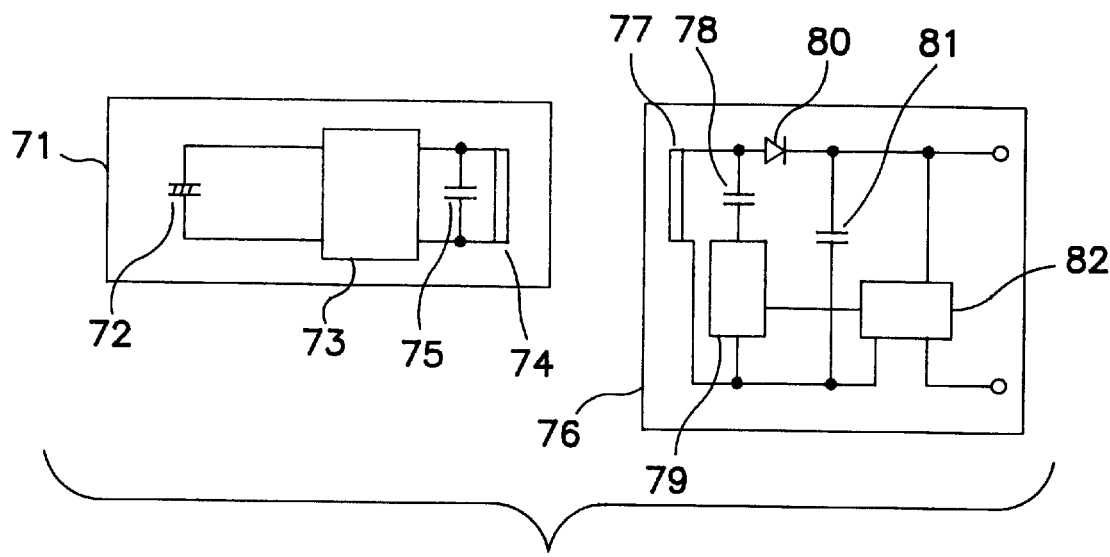
FIG. 8(a) is a circuit block diagram of a seventh embodiment.

FIG. 8(a) is a circuit block diagram of an embodiment of a power supply device having a control circuit provided at the secondary side, in which reference numeral 71 is a primary side power source unit composed of a DC input power source 72, a high frequency current generator 73, a primary side coil 74, and a primary side resonance capacitor 75, 76 is a secondary side power source unit composed of a secondary side coil 77, a secondary side resonance capacitor 78, an impedance variable circuit 79, a secondary side rectifier 80, and output capacitor 81, and an output detection circuit 82, and the impedance variable circuit 79 is inserted between the secondary side resonance capacitor 78 and the secondary side coil 77, and it is designed to be controlled by the output detection circuit 82 connected to both ends of the output capacitor 81.

In thus constituted non-contact type DC power supply device, the operation is described below.

In the primary side coil 74, a high frequency current generated in the high frequency current generator 73 flows, and by this current, a high frequency voltage is generated in the primary side coil 74. This high frequency voltage is a sinusoidal wave owing to the resonance phenomenon of the primary side resonance capacitor 75 and the inductance of the primary side coil 74.

Figure 9A:
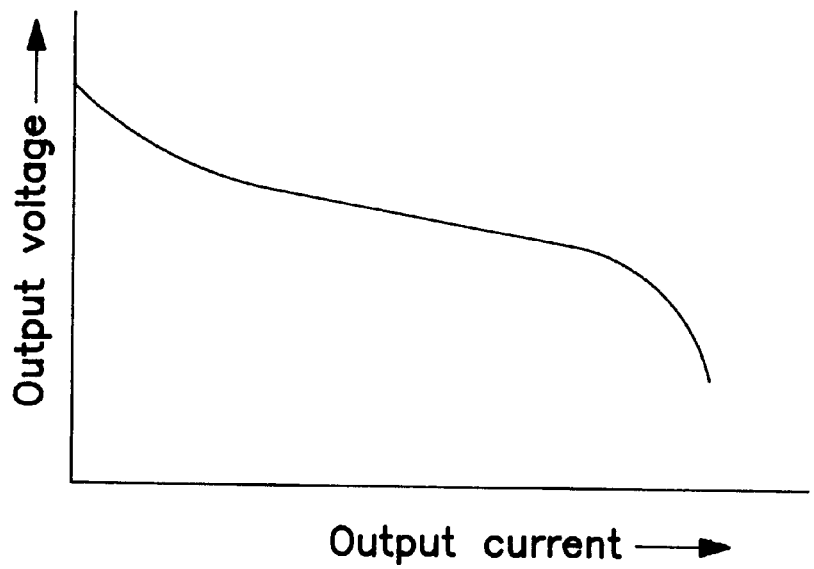
FIG. 9(a) and (b) are output voltage-current characteristic diagrams of the power supply device in FIG. 8(a) with various impedances for variable impedance circuit 78.

In the secondary side coil 77, a voltage waveform similar to this sinusoidal wave is generated, but the portion corresponding to its half wavelength is blocked by the secondary side rectifier 80. The blocked electric power of the half wavelength portion is once accumulated in the secondary side resonance capacitor 78, and is transmitted to the output at the time of next oscillation period. The characteristic of the output voltage and current at this time is shown in FIG. 9(a).

Figure 9B:
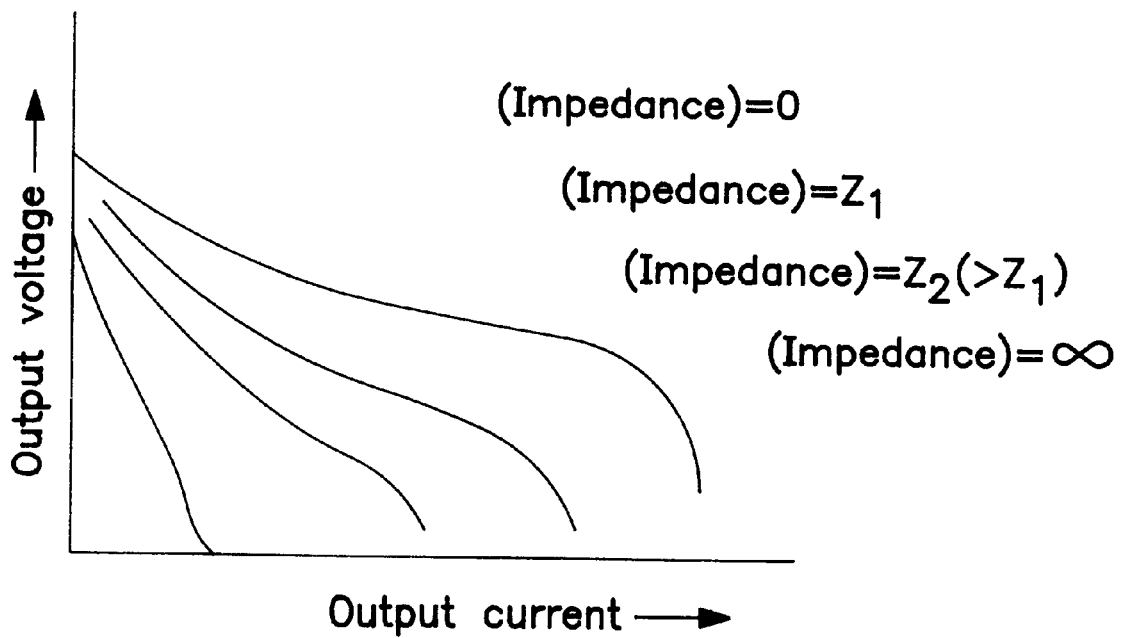

When the impedance is inserted in series to the secondary side resonance capacitor 78, the characteristic of the output voltage and current is changed by the impedance as shown in FIG. 9(b). Therefore, the output voltage or current is detected by the output detection circuit 82, and the impedance of the impedance variable circuit 79 is controlled so that it may be constant, and therefore the electric power accumulated in the secondary side resonance capacitor 78 is adjusted, and the output can be controlled at high precision.

Figure 8B:
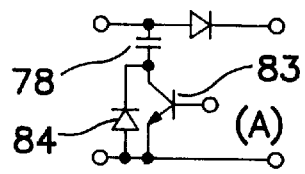
FIG. 8(b) is a specific circuit block diagram of an impedance variable circuit of the seventh embodiment.
Figure 8E:
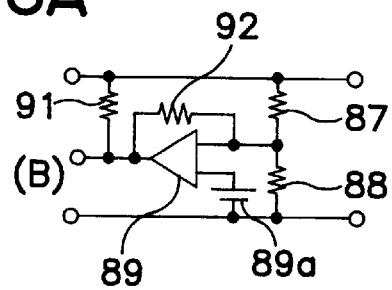
FIG. 8(e) and (f) are specific circuit block diagrams of an output detecting circuit of the seventh embodiment.
Figure 8C:
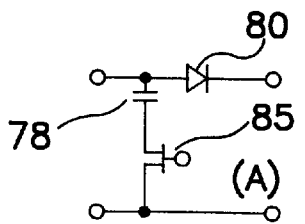
FIG. 8(c) is another specific circuit block diagram of an impedance variable circuit the seventh embodiment.
Figure 8F:
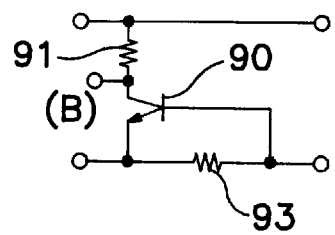
FIG. 8(d) is a specific circuit block diagram of an output detecting circuit of the seventh embodiment.
Figure 8D:
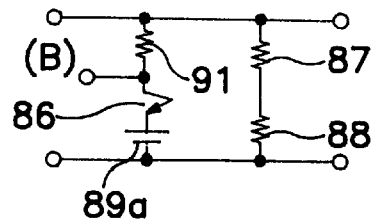

FIG. 8(b) and (c) show practical examples of the impedance variable circuit 79, (b) showing a parallel circuit of transistor 83 and diode 84 and (c) using a field effect transistor 85, and FIG. 8(d), (e), (f) show practical examples of the output detection circuit 82.

FIG. 8(d) is composed of a transistor 86, and resistances 87, 88 for feeding partial voltage of the output voltage to its base, (e) using a differential amplifier 89, and (f) uses an output current detection circuit for detecting the output current of a transistor 90.

In the diagram, (A) denotes a terminal unit for receiving an output for control from an output voltage (current) detection circuit to the impedance variable circuit 79, and (B) shows an output terminal unit of an output voltage (current) detection circuit to the impedance variable circuit 79.

Reference numerals 91, 92, 93 are resistances, and 89a is a reference battery for generating a reference voltage.

In this embodiment, therefore, by providing the secondary side resonance capacitor 78 with impedance variable circuit 79 and output detection circuit 82, the output, which was hard to stabilize hitherto, is stabilized, and a power supply device obtaining an output of high precision can be realized.

Embodiment 8

Figure 10:
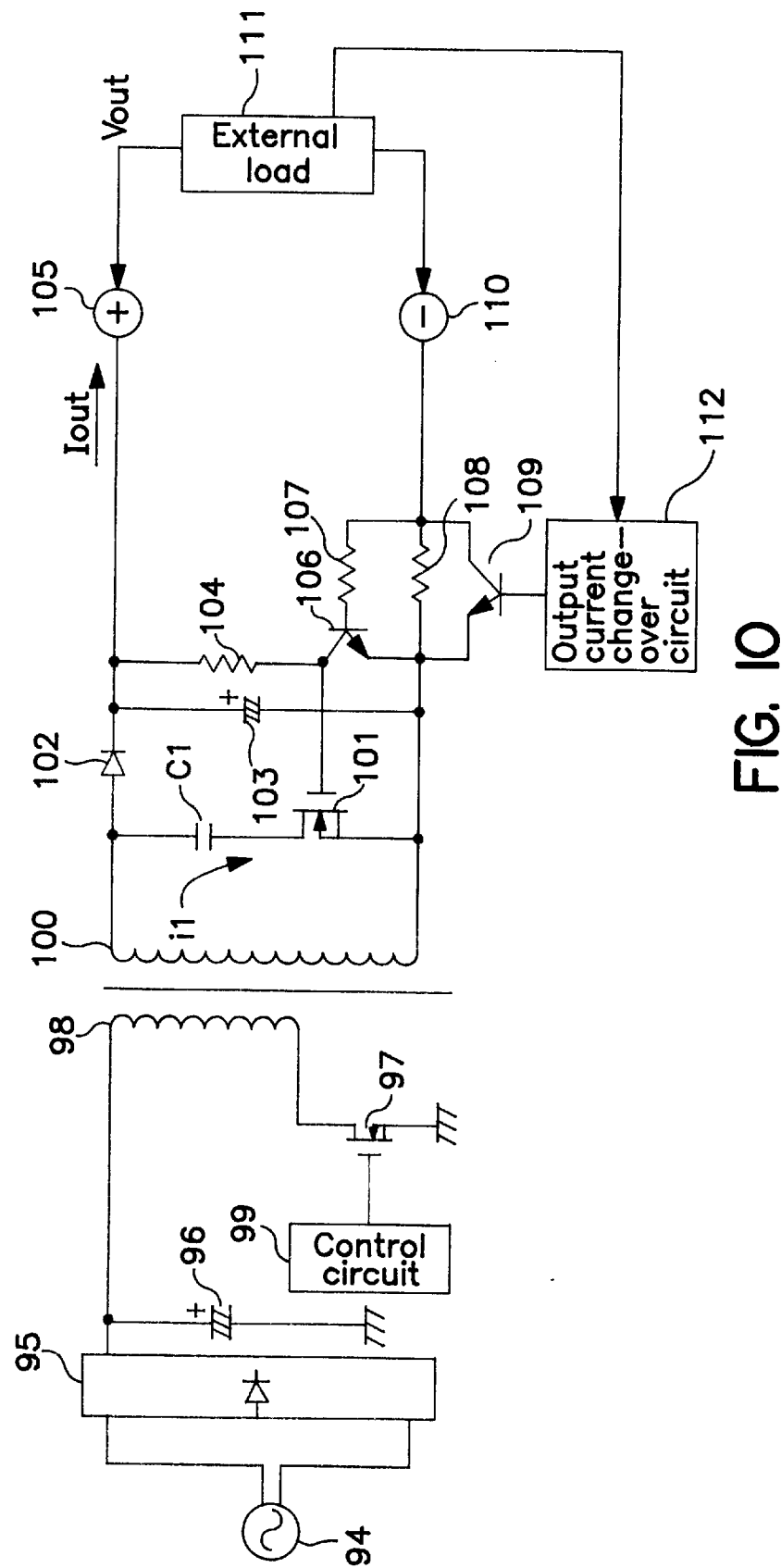
FIG. 10 is a circuit block diagram of an eight embodiment.

FIG. 10 is a circuit diagram of an embodiment of the invention, in which the primary side composes a constant power oscillating circuit stabilized at the primary side, by connecting a primary side coil 98 of switching transformer to an AC power source 94 through a rectifying and smoothing circuit consisting of a rectifying circuit 95 and a capacitor 96, and a primary switching element 97, and connecting a control circuit 99 to the primary switching element 97. At the secondary side of the switching transformer, a transistor (FET) 101 is connected to a secondary side coil 100 through a capacitor C1, and a capacitor 103, a resistance 104, and an output terminal 105 are connected to the secondary side coil 100 of the switching transformer through a diode 102. Moreover, output terminal 105 is connected to a transistor 106 and the transistor (FET) 101 through the resistance 104, the transistor 106 is connected from the base to a detection resistance 108 through a resistance 107, and to an output terminal 110 and a transistor 109, and the transistor (FET) 101 is connected in series to the capacitor C1, and the impedance of the transistor (FET)101 is varied, and thereby the energy transmitted to the load side is changed, so that a constant voltage and constant current control is achieved.

Figure 11:
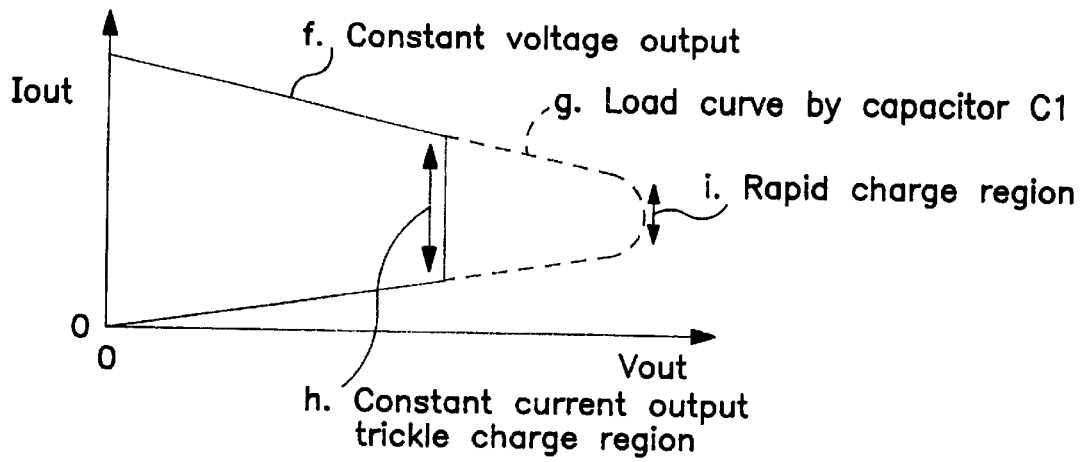
FIG. 11 is an output characteristic diagram of the eighth embodiment.

In this constitution, the voltage obtained through the secondary side coil 100 of the switching transformer and the capacitor C1 is rectified and smoothed by the diode 102 and capacitor 103, and this output is connected to the output terminals 105, 110 through the detection resistance 108, so that the current may be always stabilized. A battery and others are connected to an external load 111, and the state of the external load (battery, etc.)111 is monitored by an output current changeover circuit 112, and, as shown in FIG. 11, the transistor 109 is driven, and the charging current supplied into the external load 111 is changed over to rapid charge level or trickle charge level, so that the external load 111 may be charged optimally.

Embodiment 9

Figure 12:
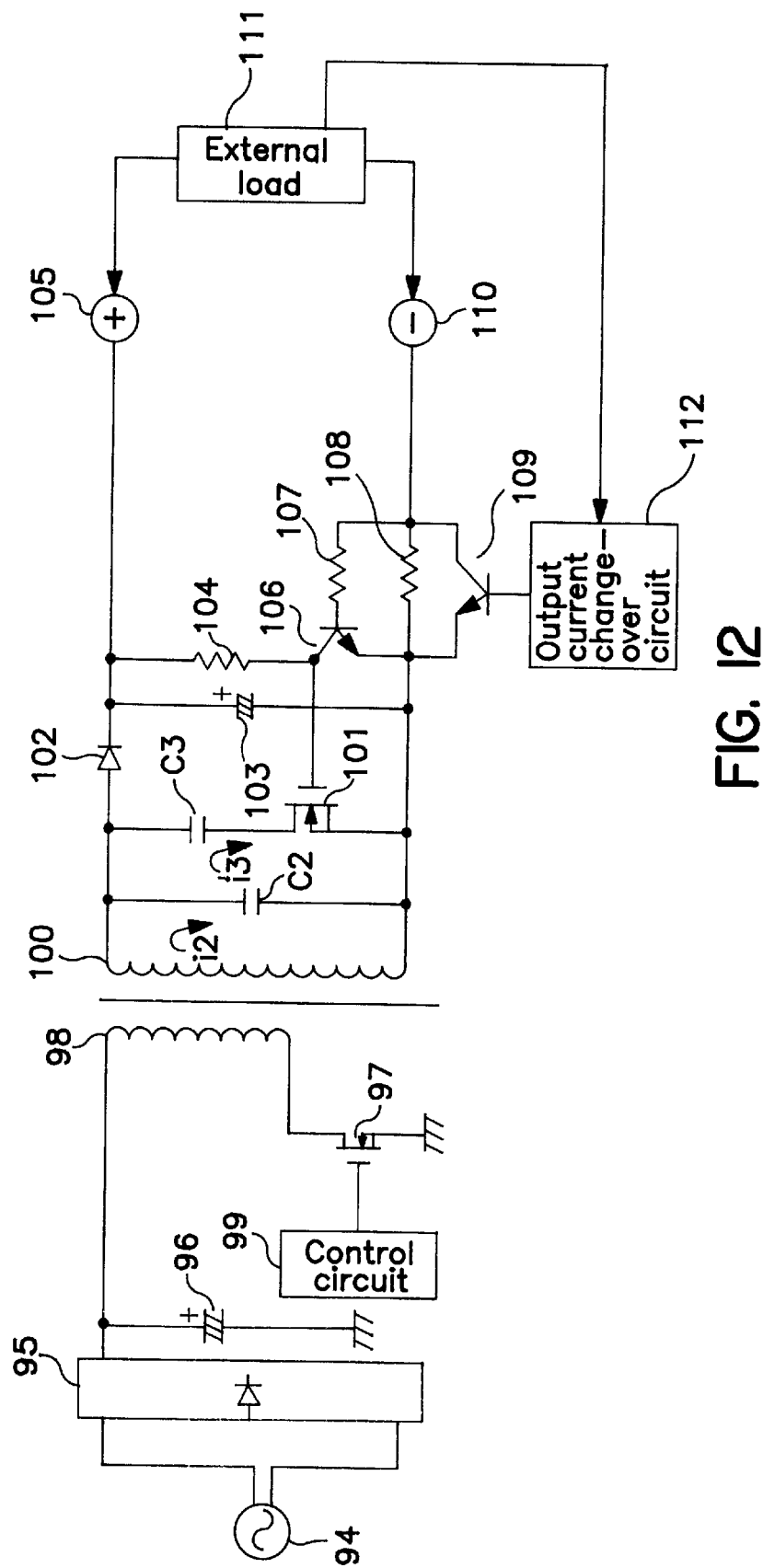
FIG. 12 is a circuit block diagram of a ninth embodiment.

FIG. 12 shows other embodiment of the invention, which is improved from the embodiment in FIG. 10.

In the embodiment in FIG. 10, constant voltage and current control is realized by varying the impedance of the transistor (FET)101, and in rapid charge, the transistor (FET) 101 is completely turned on, and a maximum output is obtained, so that a maximum power is supplied to the external load 111. In an output characteristic diagram in FIG. 11, corresponding to curve f and curve g, it is charged by curve i (rapid charge region). At this time, the transistor 101 is turned on, and the impedance between the drain and source is small, and heat generation is kept low.

In trickle charge, however, when the external load 111 is fully charged, the transistor 109 is turned off by the output current changeover circuit 112, and a current flows into the detection resistance 108, and when the voltage at its both ends reaches the threshold voltage of the transistor 106, the transistor 106 is turned on and the transistor (FET) 101 is turned off, and the output for limiting the output current becomes a constant current drooping characteristic. Hence, it is charged by curve h (trickle charge region) in the output characteristic diagram in FIG. 11. At this time, the transistor (FET) 101 operates in an active region, and the impedance between the drain and source increases, and the heat generation of the transistor (FET) 101 is very large, and the power consumption increases, and this problem is solved by this embodiment.

Explaining only the difference between this embodiment and FIG. 10, instead of the capacitor C1, a first capacitor C2, and a series circuit of transistor (FET) 101 and second capacitor C3 parallel thereto are provided between the both ends of the secondary side coil 100, and the sum of the capacities of the first and second capacitors is nearly same as the capacity of the capacity C1 in FIG. 10.

In this constitution, too, the voltage obtained by the secondary side coil 100 of the switching transformer, and first capacitor C2 and second capacitor C3 is rectified and smoothed by the diode 102 and capacitor 103, and this output is connected to the output terminals 105, 110 through the detection resistance 108, and the current is always stabilized, and same as in the embodiment in FIG. 10, in rapid charge, the transistor (FET) 101 is completely turned on and a maximum output is obtained, and a maximum power is supplied to the external load 111. In an output characteristic diagram in FIG. 13, corresponding to curve a and curve b, it is charged by curve e (rapid charge region). At this time, since the transistor (FET) 101 is turned on, the impedance between the drain and source is very small, and heat generation is kept low.

Figure 13:
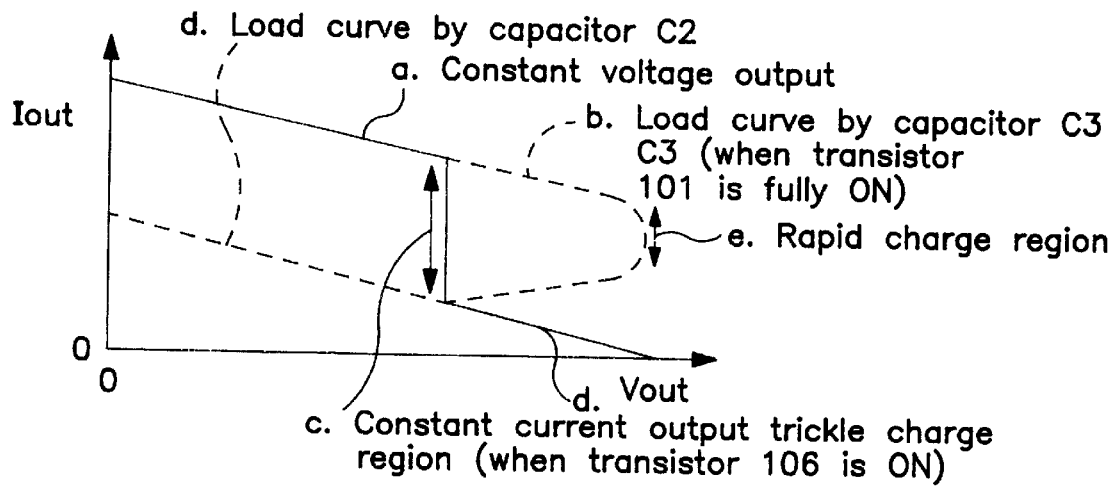
FIG. 13 is an output characteristic diagram of the ninth embodiment.
Figure 16:
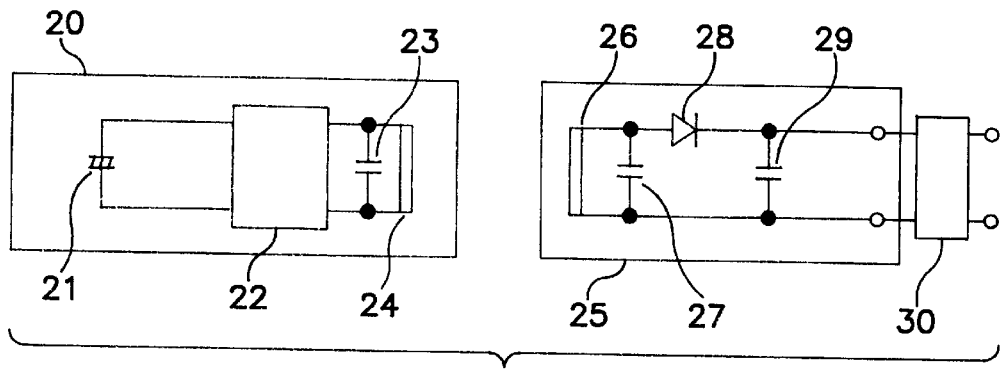
FIG. 16 is a circuit diagram of an other conventional power supply device.

In trickle charge, moreover, when the battery of the external load 111 is fully charged, the transistor 109 is turned off by the output current changeover circuit 112, and a current flows into the detection resistance 108, and the voltage at both ends reaches the threshold voltage of the transistor 106, thereby turning on the transistor 106 and turning off the transistor (FET) 101, so the output current is limited and becomes a constant current characteristic, so that it is charged by curve c (trickle charge region) in the output characteristic diagram in FIG. 13. At this time, since the transistor (FET) 101 operates in an active region, the impedance between the drain and source is large, and heat generation of the transistor (FET) 101 is very large, but since the capacitors C2 and C3 are provided parallel, the capacity of prior art C1=C2+C3, the currents flowing in the capacitors are distributed into i2 and i3, and the current flowing in each capacitor is a high frequency current, and hence it is determined by the switching frequency and the capacity of the capacitor, and therefore the current is large when the switching frequency is high and the capacity of the capacitor is large, but when the impedance between the drain and source of the transistor (FET) 101 is constant, the relation between the current i1 flowing in the capacitor C1 in FIG. 10 and the current i3 flowing in the second capacitor C3 in the embodiment is i1>i3, so that the heat generation of the transistor (FET) 101 in this circuit is kept low.

Moreover, since the dynamic range of the output is small herein, considering the load curve (curve d in FIG. 13) by the first capacitor C2, the capacitors C2 and C3 are set appropriately so as to maintain the trickle charge region (curve c in FIG. 13).

Embodiment 10

Figure 14:
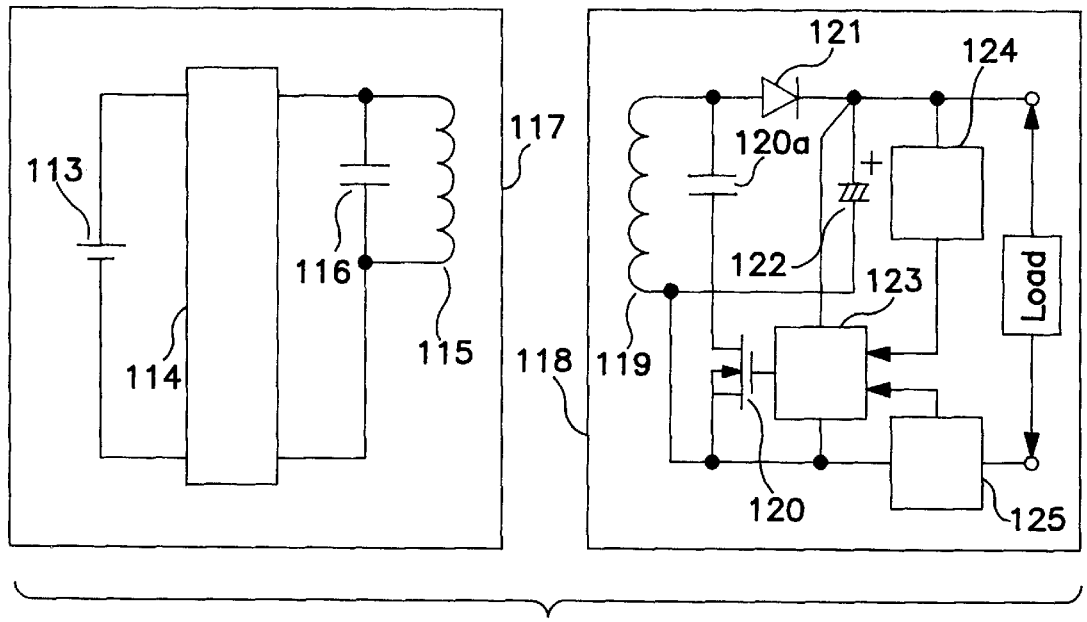
FIG. 14 is a circuit block diagram of a tenth embodiment.

FIG. 14 is a circuit block diagram of a different embodiment, in which an input power source 113 is a DC voltage rectified and smoothed from a commercial power source, and a parallel circuit of primary side coil 115 and capacitor 116 is connected through a switching unit 114 to compose a primary side power supply device.

A secondary side power supply device 118 has a capacitor 120a and a switching element 120 connected in series to both ends of a secondary side coil 119, and a series circuit of diode 121 and capacitor 122 is connected, and an output is supplied to the load through a pulse width control unit 123, a constant voltage control unit 124, and a constant current control unit 125.

The operation and the circuit composition are specifically described below. In the primary side power supply device 117, when the input power source 113 is applied, the switching unit 114 operates, and a high frequency current is supplied into the primary side coil 115. At the same time, the primary side coil 115 resonates with the capacitor 116, and a high frequency voltage is induced.

Moreover, the voltage induced in the primary side coil 115 is further induced in the confronting secondary side coil 119, and when the switching element 120 is turned off, the secondary side coil 119 and capacitor 120a do not resonate, and only the voltage induced from the primary side coil 115 is obtained, and when the switching element 120 is turned on, the secondary side coil 119 and capacitor 120a resonate, and a high output is obtained. Still more, the resonated voltage and non-resonated voltage are averaged by the time ratio of ON period and OFF period, and rectified and smoothed by the diode 121 and capacitor 122, so that an output is obtained at both ends of the capacitor 122.

Furthermore, in order that the voltage obtained in the capacitor 122 may be always constant, a signal is transmitted from the constant voltage control unit 124 to the pulse width control unit 123. Herein, the pulse width control unit 123 is controlled by a constant frequency, and when the output voltage is lowered, the ON period of the output pulse is extended, so that it is controlled to extend the ON period of the switching element 120, that is, the ON period of the capacitor 120a, and the resonance period of the secondary side coil 119 and capacitor 120a is extended, thereby acting to raise the voltage.

To the contrary, when the output voltage is raised, it is controlled to shorten the ON period of the output pulse, and the resonance period of the secondary side coil 119 and capacitor 120a is shortened, thereby acting to lower the voltage.

Also, in order that the current supplied to the load may be always constant, a signal is transmitted from the constant current control unit 125 to the pulse width control unit 123, and when the output current decreases, the ON period of the output pulse is extended to control to extend the ON period of the switching element 120, that is, the ON period of the capacitor 120a, and the resonance period of the secondary side coil 119 and capacitor 120a is extended, thereby acting to increase the current.

To the contrary, when the output current increases, it is controlled to shorten the ON period, and the resonance period of the secondary side coil 119 and capacitor 120a is shortened, thereby acting to decrease the current.

Thus, by controlling the on/off period of the switching pulse by the pulse width control unit 123, the on/off period of the capacitor 120a is controlled, and the output voltage and output current is controlled, so that a constant voltage and constant current output is supplied to the load.

Meanwhile, only one of the constant voltage control unit 124 and constant current control unit 125 may be used, depending on whether the load requires a constant voltage or a constant current.

Thus, in the invention, at the secondary side, the first capacitor and switching element are connected in series to both ends of the coil, and the second capacitor is connected from the junction of the coil and the first capacitor through the diode, and either the constant voltage control unit or the constant current control unit is provided, and also the pulse width control unit for on/off control of the switching element by the signal from the constant voltage control unit or constant current control unit is provided, and therefore the output is obtained by on/off control of resonance of the secondary side coil 119 and capacitor 120a, not depending on analog control as in the transistor (FET) 101 in FIG. 12, and heat generation is very small, and it contributes much to downsizing of the device.

INDUSTRIAL APPLICABILITY

Thus, the power supply device of the invention is a power supply device capable of obtaining a stable output by controlling the primary side or controlling the secondary side.

In particular, (1) In an aspect in which one end of a control winding of a switching transformer is connected to a junction of a series circuit of a resistance and a capacitor connected to an input power source, other end of the control winding is connected to a control terminal of a switching element, and a discharge circuit driven by a signal of the control winding of the switching transformer is connected to the one end of the control winding, when composing an oscillation circuit and a control circuit at the primary side, high withstand voltage diodes are not necessary, there is no effect of reverse leak current and the operation is stabilized, and a nearly ideal switching operation is effected, so that a highly reliable power supply device is realized by using inexpensive parts.

(2) In an aspect in which a clamp circuit is provided, by clamping the voltage applied to the gate of the switching element, unnecessary spike voltage can be removed.

(3) In an aspect in which a primary side coil of switching transformer and a switching element are connected in series to both ends of an input power source, a first resistance and a capacitor are connected in series to the input power source, a second resistance is connected parallel to the capacitor, the junction of the first resistance and the capacitor is connected to one end of a control winding of the switching transformer, other end of the control winding of the switching transformer is connected to a control terminal of the switching element, and a peak voltage control circuit, as means for discharging said capacitor, composed of a voltage detection unit for detecting the peak voltage by dividing the resistance from the drain of the switching element and a control unit composed of transistor and resistance through a constant voltage diode from the junction divided by the resistance is provided as means for discharging the capacitor, when composing an oscillation circuit and a control circuit at the primary side, each pulse of switching can be controlled, and precise and stable action is realized, so that nearly ideal switching characteristic and output characteristic may be obtained.

(4) In a power supply device in which a primary side coil supplied with a high frequency current, and a secondary side coil installed in a casing different from the primary side coil confront each other, and an electric power is transmitted from the primary side coil to the secondary side coil, a series circuit of capacitor and impedance variable circuit connected to both ends of the secondary side coil, and output detecting means for detecting the output by the secondary side coil are provided, and in an aspect for controlling the impedance variable circuit by output of the output detecting means, by controlling the impedance of the impedance variable circuit, the electric power accumulated in the secondary side resonance capacitor is adjusted, so that the output may be controlled precisely.

(5) In an aspect in which the output detecting means is connected by installing an output current changeover circuit connected to the output detecting means, the charging current can be changed over between rapid charge and trickle charge (ordinary charge).

(6) In an aspect in which other capacitor is connected parallel to a series circuit of a capacitor and a transistor which is an impedance variable circuit connected to both ends of a secondary side coil, heat generation in trickle charge can be suppressed, and hence cooling plate is not needed, and the transistor can be reduced in size, contributing to downsizing of the power supply device.

(7) In an aspect in which a first capacitor and a switching element are connected in series to both ends of a coil at the secondary side, a second capacitor is connected from the junction of the coil and first capacitor through a diode, a constant voltage control unit or a constant current control unit is provided, and a pulse width control unit for on/off control of the switching element by a signal from the constant voltage control unit or constant current control unit is provided, since an output is obtained by on/off control of resonance of the secondary side coil and capacitor, not depending on analog control, heat generation is small, and it contributes to downsizing of the device.

(8) In an aspect in which a primary side coil and a secondary side coil are provided in different housings, it is useful for portable electronic appliances such as cordless telephone, as a non-contact type power supply device.

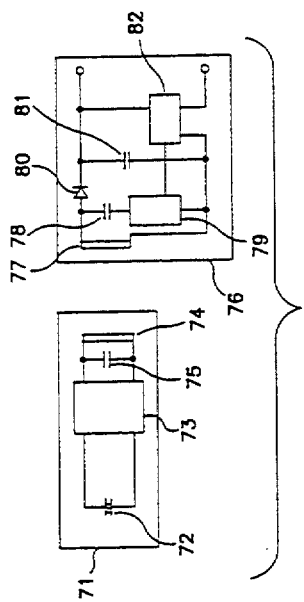
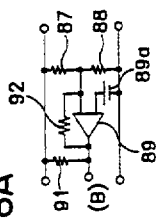
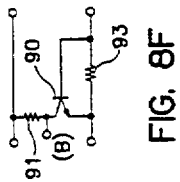
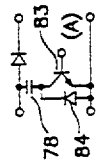
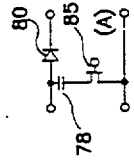
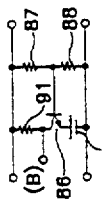

We claim:

1. A power supply device, wherein one end of a primary side coil of a switching transformer is connected to a first terminal of an input power source, other end of this primary side coil is connected to one end of a switching element, other end of this switching element is connected to a second terminal of the input power source, further one end of a first resistance is connected to the first terminal of said input power source, other end of this first resistance is connected to one end of a capacitor, other end of this capacitor is connected to the second terminal of said input power source, the junction of said first resistance and said capacitor is connected to one end of a control winding of said switching transformer, other end of the control winding of said switching transformer is connected to a control terminal of said switching element, a series circuit of a second resistance and a control element is connected between the second terminal of said input power source and the control terminal of said switching element, and a control terminal of said control element is connected to the junction of said first resistance and said capacitor, whereby the primary side coil of said switching transformer and the control winding is a positive feedback through said switching element, and the control element is conducted by elevation of the voltage of the control winding of said switching transformer over a specified value to control the voltage at both ends of said capacitor.

2. A power supply device of claim 1, further comprising a clamp circuit composed of a resistance connected between one end of the control winding of said switching transformer and the control terminal of said switching element, and one or a plurality of diodes of same polarity connected in series, connected between the control terminal of said switching element and the other end of the control winding of said switching transformer.

3. A power supply device, wherein one end of a primary side coil of a switching transformer is connected to a first terminal of an input power source, other end of this primary side coil is connected to one end of a switching element, other end of this switching element is connected to a second terminal of the input power source, further one end of a first resistance is connected to the first terminal of said input power source, other end of this first resistance is connected to one end of a capacitor, other end of this capacitor is connected to the second terminal of said input power source, a second resistance is connected parallel to said capacitor, the junction of said first resistance and said capacitor is connected to one end of a control winding of said switching transformer, other end of the control winding of said switching transformer is connected to a control terminal of said switching element, a peak voltage control circuit is provided as means for controlling the voltage of the capacitor for dividing and detecting the peak voltage between the junction of the end of the primary side coil of the switching transformer and one end of the switching element and the second terminal of the input power source, and applying to the control terminal of the control element when exceeding the specified voltage, the primary side coil of the switching transformer and the control winding are connected so as to be a positive feedback through the switching element, and the voltage of the capacitor is discharged by the control output of the peak voltage control circuit.

4. A power supply device comprising a primary side coil supplied with a high frequency current and a secondary side coil installed in a housing different from said primary side coil, confronting each other, for transmitting an electric power from said primary side to said secondary side coil, further comprising a series circuit of a capacitor connected at both ends of said secondary side coil and an impedance variable circuit, and output detecting means for detecting an output voltage or an output current by said secondary side coil, wherein said impedance variable circuit is controlled to increase the impedance of said impedance variable circuit when the output voltage of said secondary side coil is raised by the output of said output detecting means.

5. A power supply device of claim 4, wherein an output current changeover circuit is connected to the output detecting means to control said output detecting means.

6. A power supply device of claim 5, wherein other capacitor is connected parallel to said series circuit of a capacitor and an impedance variable circuit connected to both ends of a secondary side coil.

7. A power supply device comprising a primary side coil supplied with a high frequency current, and a secondary side coil confronting said primary side coil, for transmitting an electric power from said primary side coil to said secondary side coil, wherein a first capacitor and a switching element are connected in series to both ends of said secondary side coil, a second capacitor is connected from the junction of said secondary side coil and said first capacitor through a diode, constant voltage control means for detecting the voltage of this second capacitor and/or constant current control means for detecting the output current from said second capacitor to the load is provided, and pulse width control means for receiving the output of said constant voltage control means and/or said current control means and controlling said switching element by the pulse of specified frequency is provided, whereby when the constant voltage control mans detected decline of the output voltage, the ON period of the output pulse is extended, and when rise of the output voltage is detected, the ON period of the output pulse is shortened, and when the constant current control means detects decrease of the output current, the ON period of the output pulse is extended, and when increase of the output current is detected, the ON period of the output pulse is shortened.

8. A power supply device of claim 1, wherein a primary side coil and a secondary side coil are provided in different housings.

9. A power supply device of claim 3, wherein a primary side coil and a secondary side coil are provided in different housings.

10. A power supply device of claim 4, wherein a primary side coil and a secondary side coil are provided in different housings.

11. A power supply device of claim 7, wherein a primary side coil and a secondary side coil are provided in different housings.

* * * * *

UNITED STATES PATENT AND TRADE MARK OFFICE
CERTIFICATE OF CORRECTION

PATENT NO. : 5,917,712
DATED : June 29, 1999
INVENTOR(S) : Okura et al.

It is certified that error appears in the above-identified patent and that said Letters Patent is hereby corrected as shown below:

Column 14, line 40, "mans" should be --means--.

Signed and Sealed this

Twentieth Day of February, 2001

Attest:

NICHOLAS P. GODICI

Attesting Officer     Acting Director of the United States Patent and Trademark Office

UNITED STATES PATENT AND TRADEMARK OFFICE
CERTIFICATE OF CORRECTION

PATENT NO. : 5,917,712
DATED : June 29, 1999
INVENTOR(S) : Okura et al.

Page 2 of 2

It is certified that error appears in the above-identified patent and that said Letters Patent is hereby corrected as shown below: